US006799786B2

(12) United States Patent  (10) Patent No.: US 6,799,786 B2
Hein  (45) Date of Patent: Oct. 5, 2004

(54) INSTRUMENT PANEL FOR A VEHICLE

(75) Inventor: David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/290,744

(22) Filed: Nov. 8, 2002

(65) Prior Publication Data

US 2004/0090078 A1 May 13, 2004

(51) Int. Cl.⁷ .............................................. B62D 25/14
(52) U.S. Cl. ...................................... 296/70; 296/39.1
(58) Field of Search .......................... 296/70, 192, 208, 296/39.1, 146.1, 72; 174/72 A, 251; 307/641, 752, 785, 10.1; 439/34, 131, 157; 180/90; 333/246; 29/564.6; 235/492; 228/110.1; 52/716.5; 62/244

(56) References Cited

U.S. PATENT DOCUMENTS

| | | | | |
|---|---|---|---|---|
| 4,910,641 A | * | 3/1990 | Yanase | 296/70 |
| 5,276,414 A | * | 1/1994 | Fujimoto et al. | 333/246 |
| 5,354,114 A | | 10/1994 | Kelman et al. | |
| 5,442,518 A | * | 8/1995 | Beam | 174/72 A |
| 5,467,520 A | * | 11/1995 | Nunez et al. | 29/564.6 |
| 5,595,415 A | * | 1/1997 | Beaulat | 296/39.1 |
| 5,615,080 A | * | 3/1997 | Nishitani et al. | 307/10.1 |
| 5,706,170 A | | 1/1998 | Glovatsky et al. | |
| 5,712,764 A | | 1/1998 | Baker et al. | |
| 5,715,140 A | | 2/1998 | Sinkunas et al. | |
| 5,754,398 A | | 5/1998 | Glovatsky et al. | |
| 5,856,908 A | | 1/1999 | Takiguchi et al. | |
| 5,979,965 A | * | 11/1999 | Nishijima et al. | 296/70 |
| 6,048,020 A | | 4/2000 | Gronowicz et al. | |
| 6,062,888 A | | 5/2000 | Takiguchi | |
| 6,079,765 A | * | 6/2000 | Zaguskin et al. | 296/146.1 |
| 6,086,145 A | * | 7/2000 | Wandyez | 296/39.1 |
| 6,095,585 A | | 8/2000 | Pilhall | |
| 6,120,327 A | | 9/2000 | O'Brien et al. | |
| 6,142,556 A | * | 11/2000 | Tanaka et al. | 296/39.1 |
| 6,161,761 A | * | 12/2000 | Ghaem et al. | 235/492 |
| 6,186,885 B1 | | 2/2001 | Ahn et al. | |
| 6,250,706 B1 | | 6/2001 | Davis, Jr. et al. | |
| 6,257,897 B1 | | 7/2001 | Kubota | |
| 6,310,302 B1 | | 10/2001 | Mori | |
| 6,315,347 B1 | * | 11/2001 | Gotz | 296/72 |
| 6,344,613 B1 | | 2/2002 | Kolodziej | |
| 6,354,623 B1 | | 3/2002 | Delmastro | |
| 6,364,394 B1 | | 4/2002 | Davis, Jr. et al. | |
| 6,371,548 B1 | | 4/2002 | Misaras | |
| 6,409,590 B1 | * | 6/2002 | Suzuki et al. | 296/70 |
| 6,464,280 B1 | * | 10/2002 | Shibata et al. | 296/70 |
| 6,588,646 B2 | * | 7/2003 | Loprire | 228/110.1 |
| 6,625,949 B2 | * | 9/2003 | Billiu | 52/716.5 |
| 6,629,424 B1 | * | 10/2003 | Araki et al. | 62/244 |
| 2001/0003404 A1 | | 6/2001 | Shikata et al. | |
| 2002/0017798 A1 | | 2/2002 | Shikata et al. | |
| 2002/0050726 A1 | * | 5/2002 | Okana et al. | 296/70 |
| 2003/0155793 A1 | * | 8/2003 | Yoshihara et al. | 296/208 |

FOREIGN PATENT DOCUMENTS

| | | |
|---|---|---|
| GB | 2 213 422 | 8/1989 |
| GB | 2 369 798 | 6/2002 |
| JP | 1-115550 | 5/1989 |
| JP | 10-258771 | 9/1998 |
| JP | 2001-88578 | 4/2001 |

OTHER PUBLICATIONS

One page article entitled "Hidden Weld", from unknown source, published prior to Nov. 8, 2002.

* cited by examiner

Primary Examiner—Kiran B. Patel
(74) Attorney, Agent, or Firm—Bill C. Panagos

(57) ABSTRACT

An instrument panel including a first portion and a second portion separate from the first portion. At least one wire is disposed between the first and second portions. The first and second portions are welded together, thereby trapping and retaining the wire.

15 Claims, 3 Drawing Sheets

INSTRUMENT PANEL FOR A VEHICLE

BACKGROUND OF THE INVENTION

This invention relates in general to instrument panels for vehicles, and in particular to a method of manufacturing an instrument panel incorporating wiring therein.

Virtually all passenger vehicles include an instrument panel generally positioned underneath the windshield and attached to the frame of the vehicle behind the engine compartment. Generally, the ends of the instrument panel are attached to lateral side members of the frame of the vehicle. The instrument panel encloses various vehicle components, such as electrical and ventilation systems, audio systems, vehicle instrument gauges and displays, and auxiliary compartments.

To connect the various electrical components mounted in the instrument panel, electrical wiring is typically routed within or about the instrument panel, such as adjacent to the ventilation ducts. Typically, the instrument panel is first mounted on the vehicle at a vehicle assembly plant. After installation, the wiring is manually routed to appropriate locations within the instrument panel. The wiring is then attached to the instrument panel, such as by pressure sensitive adhesive tape. Openings formed in the instrument panel assist in manually routing the wiring. The openings are generally formed for receiving components or storage compartments not yet installed on the instrument panel. Typically, an electrical fuse box or power distribution block is mounted in or adjacent the instrument panel to which a portion of the wiring is connected for providing electrical power to the component. Wiring may also be used for providing electrical communication for conveying information between various electrical components. Additional wiring may also be routed through the instrument to connect other electrical components not mounted in the instrument panel or not connected to the fuse box.

Modern vehicles include numerous wires to electrically connect the electrical components together. Therefore, instead of routing loose arrays of wires throughout the instrument panel, the wires are appropriately grouped together to form a wiring harnesses. The wiring harness includes electrical connectors attached to the ends of the wires to provide a mating electrical connection with another connector electrically. Although this manner of routing wiring through the instrument panel and attaching it thereto has been found satisfactory in the past, the manual routing and attachment is time consuming and costly. The wiring is also susceptible to vibration generating unwanted noise.

BRIEF SUMMARY OF THE INVENTION

This invention relates to an instrument panel and method of manufacturing the same. The instrument panel includes a first portion and a second portion separate from the first portion. At least one wire is disposed between the first and second portions. The first and second portions are welded together, thereby trapping and retaining the wire.

In the preferred method of manufacturing the instrument of the present invention, at least one wire is disposed between first and second portions. The first and second portions are then welded together such that the wire is retained between the first and second portions. In a more preferred method, the first portion is made of a first material having a first pigmentation, and the second portion is made of a second material having a second pigmentation different from the first pigmentation. The weld is created by use of a laser, wherein the wavelength of the laser beam is set such that the laser beam generally passes though the first portion and is absorbed by the second portion, thereby heating the second material to create a weld between the first and second portions.

Various objects and advantages of this invention will become apparent to those skilled in the art from the following detailed description of the preferred embodiment, when read in light of the accompanying drawings.

DETAILED DESCRIPTION OF THE INVENTION

Figure 1:
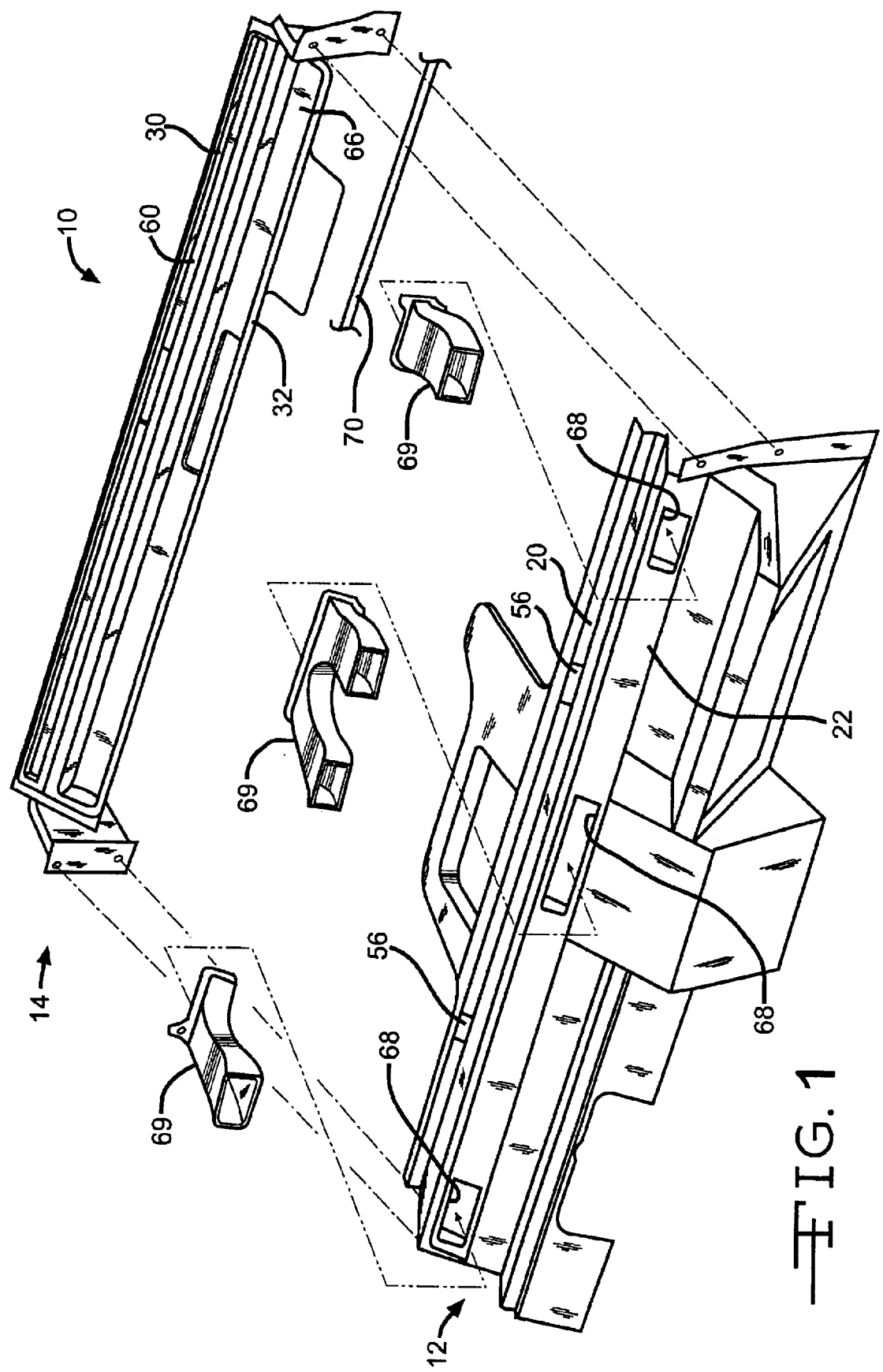
FIG. 1 is an exploded perspective view of an instrument panel in accordance with the present invention.

Referring now to the drawings, there is illustrated in FIG. 1 an instrument panel, indicated generally at 10. The instrument panel 10 is ideally suited for mounting to side frame members of a vehicle, and in particular, underneath the windshield behind the engine compartment of the vehicle. The instrument panel 10 can be any suitable shape and configuration for housing various vehicle components, such as electrical and ventilation systems, steering assemblies, vehicle instrument gauges and displays, sensors, lights, gauges, audio and entertainment systems, message centers, climate controls, wiper controls, and auxiliary compartments.

The instrument panel 10 is formed from at least two portions, a front portion 12 and a rear portion 14. Of course, the instrument panel 10 can include other components or portions, such as for example, defroster ducts, energy absorbing structures, and storage compartment frames. As will be explained below, the front and rear portions are preferably attached together to form at least one ventilation duct extending in a lateral direction relative to the vehicle therethrough. The ventilation duct may extend along the entire lateral width of the instrument panel 10 or only a portion thereof.

Figure 2:
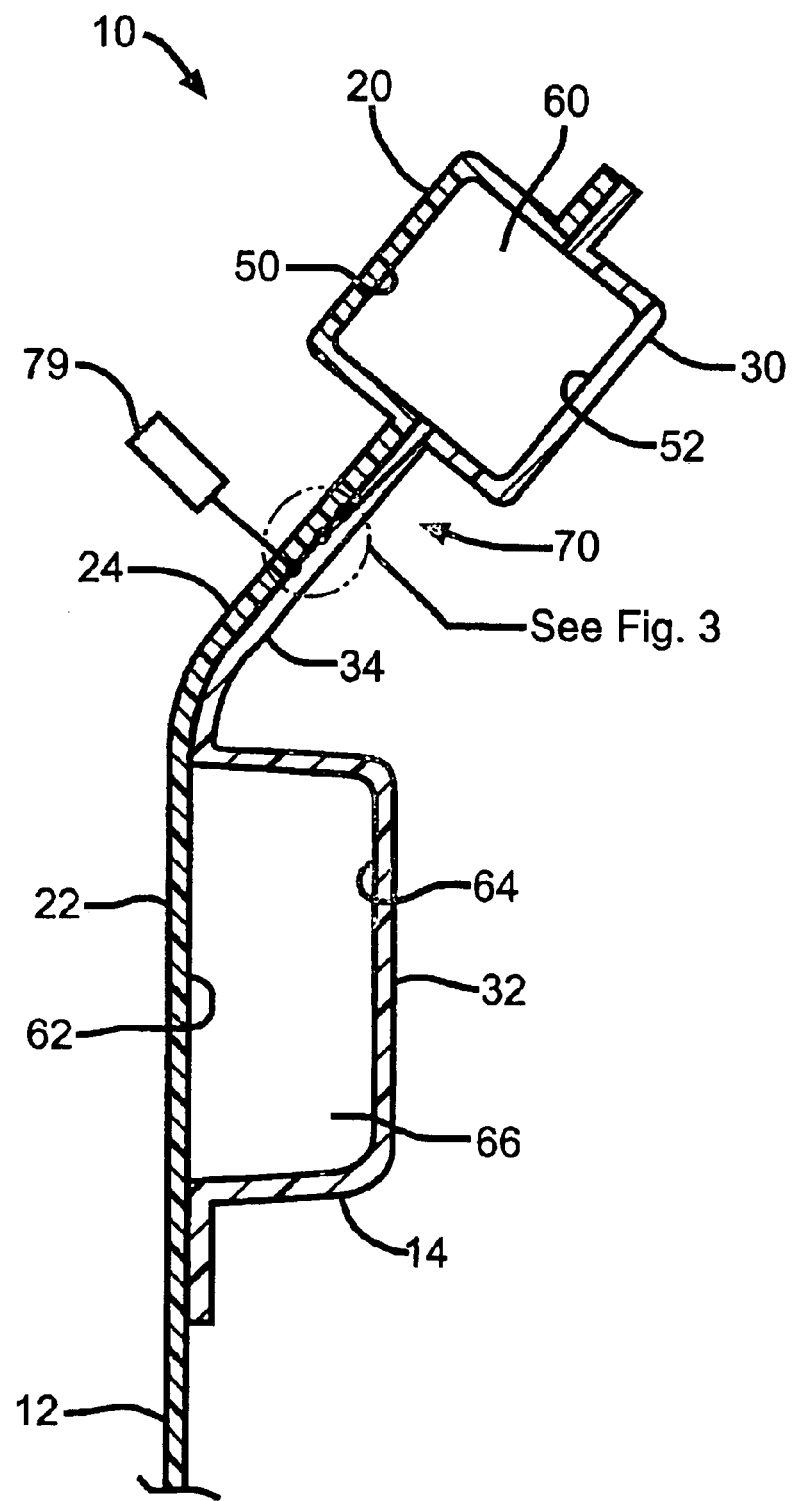
FIG. 2 is a side cross-sectional view of an upper portion of the instrument.

As best shown in FIG. 2, the front portion 12 includes a first channel portion 20, a front wall 22, and an intermediate portion 24. The rear portion 14 includes a first channel portion 30, a second channel portion 32, and an intermediate portion 34. The first channel portion 20 of the front portion 12 has a rear surface 50 cooperating with a front surface 52 of the first channel portion 30 of the rear portion 14 to define a passageway or channel 60, such as for example to provide a defroster ventilation duct. The front portion 12 may include openings 56 formed therein for directing air flow to various areas within the interior of the vehicle, such as the windshield.

The front wall 22 of the front portion 12 includes a rear surface 62 cooperating with a front surface 64 of the second channel portion 32 of the rear portion 14 to define a passageway or channel 66, such as for example to provide a main front ventilation duct. The front portion 12 may include openings 68 formed therein for providing outlets for air flow to various areas within the interior of the vehicle, such as towards the occupants and interior of the vehicle. The instrument panel 10 may further include auxiliary ductwork 69 disposed over the openings 68 for directing air flow. Although not shown in FIG. 1, the instrument panel 10 preferably includes a cover portion having an aesthetically pleasing appearance for covering the front portion 12 and facing the interior of the vehicle.

The instrument panel 10 further includes wiring, indicated generally at 70, which is disposed between the first and second portions 12 and 14 after assembly thereof to form the instrument panel 10. The wiring can be a single electrically conductive member or a plurality of members. The wiring 70 provides electrical power and/or communication between various electrical components mounted within the instrument panel and/or mounted in other locations within the vehicle. The wiring 70 can be any suitable electrically conductive material, such as for example, individual wires, a flexible flat cable, or circuit sheet. The wiring 70 may also be formed by applying a conductive material onto one of the front and rear portions 12 and 14, such as by electroless or electrolytic plating, embossing, plasma spraying, or ultrasonic embedding wherein a wire is ultrasonically vibrated in contact with the front or rear portions 12 and 14.

Figure 3:
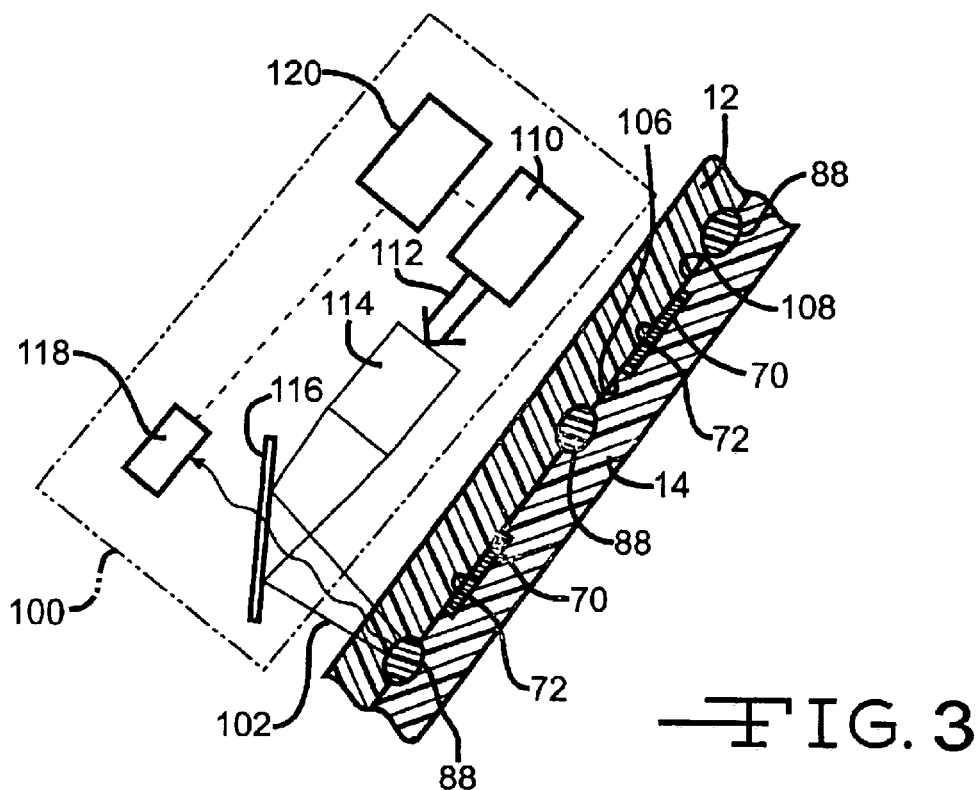
FIG. 3 is an enlarged cross-sectional view of a portion of the instrument panel illustrated in FIG. 2 illustrating a preferred method of welding portions of the instrument panel together.
Figure 4:
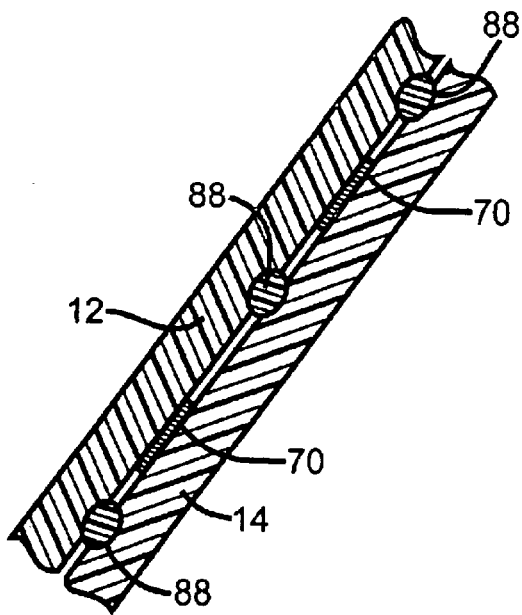
FIG. 4 is an enlarged cross-sectional view of an alternate embodiment of a portion of instrument panel.

As best seen in FIG. 3, one of the front and rear portions 12 and 14 may include a trough or groove 72 formed therein for receiving the wiring 70, thereby permitting the adjoining relatively flat surface to be flush with one another. The groove 72 may assist in positioning the wiring 70 prior to assembly of the instrument panel 10. However, it should be understood that the front and rear portions 12 and 14 do not need to include grooves 72 formed therein such that the generally thin wiring 70 may be simply disposed between flat surfaces, thereby creating a relatively small gap therebetween, such as for example as illustrated in FIG. 4.

As shown in FIG. 3, at least portions of the front and rear portions 12 and 14 adjacent the wiring 70 are welded together by one or more welds 88 so as to trap and retain the wire. Preferably, the front and rear portions 12 and 14 are made of a plastic or polymer material, wherein the welds 88 are formed by melting and preferably intermixing the materials of the front and rear portions 12 and 14. Preferably, the welds 88 are continuous and formed along the length of the channels 60 and 66 so that an airtight seal is created between the front and rear portions so that air flow or water formed by condensation may not escape the channels 60 and 66 through the welds 88. This airtight seal also helps reduce noise levels by preventing air flow from being transmitted though small gaps between the front and rear portions 12 and 14. The front and rear portions 12 and 14 can be welded together by any suitable heat source, indicated schematically at 79 in FIG. 2. The heat source 79 may use varying methods of forming the welds 88, such as for example, by ultrasonic welding or by applying direct heat to the weld locations.

In a preferred method of welding the front and rear portions 12 and 14 together, the heat source 79 is a laser, indicated generally at 100 in FIG. 3. The laser 100 may focus a light beam 102 at the weld location 88 to heat one or more of the materials comprising the front and rear portions 12 and 14 to form the welds 88.

In a more preferred method, the laser 100 creates a generally hidden weld 88 between the adjacent surfaces 106 and 108 of the front and rear portions 12 and 14, respectively. To accomplish this, the front portion 12 is made of a material having a pigmentation which is generally transparent to a certain wavelength of the beam 102 such that the beam 102 generally passes through the front portions 12 without substantially increasing the temperature of the front portion 12. The material comprising the rear portion 14 includes a different pigmentation from the pigmentation of the front portion 12 such that the beam 102 will generally be absorbed, thereby generating an increase in temperature enough to melt the material. The heat from the melted material of the rear portion 14 will cause localized melting of the adjacent material of the front portion 12, thereby creating the weld 88. This results in a joint of the front and rear portions 12 and 14 which is nearly invisible from the outside, but which is airtight and waterproof. Suitable materials for the front and rear portions 12 and 14 include polymeric, polypropylene, or glass fiber polyamide material having different pigmentation.

As shown in FIG. 3, the laser 100 may include a light generator 110 which emits a beam 112 into a lens spreader 114. The lens spreader 114 properly focuses the beam 102 with the aid of a mirror 116 at the surface 108 of the rear portion 14. Preferably, the laser 100 includes an infrared sensor 118 for monitoring the temperature of the weld 88. The information from the sensor 118 is transmitted to a control unit 120 which adjusts the intensity and/or wavelength of the beam 112 according to the temperature of the weld 88 to create a generally consistent weld. A robot arm (not shown) may guide the laser 100 to form the weld 88.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An instrument panel comprising:

a first portion;

a second portion separate from said first portion; and at least one wire disposed between said first and second portions, wherein said first and second portions are welded together by first and second welds such that said wire is disposed between said first and second welds, thereby trapping and retaining said wire.

2. The instrument panel of claim 1, wherein said first and second portions are welded together to form a generally airtight seal.

3. The instrument panel of claim 2, wherein said first portion includes a first wall, and said second portion includes a second wall, said first and second walls defining a channel for air ventilation through said instrument panel.

4. The instrument panel of claim 1, wherein said first and second portions are made of a polymeric material.

5. The instrument panel of claim 1, wherein one of said first and second portions includes a groove formed therein, and wherein said wire is disposed in said groove.

6. The instrument panel of claim 1, wherein said first and second portions are welded together by applying heat to said first and second portions.

7. The instrument panel of claim 1, wherein said first and second portions are ultrasonically welded together.

8. The instrument panel of claim 1, wherein said first and second portions are welded together by use of a laser.

9. The instrument panel of claim 8, wherein said first portion is made of a first material having a first pigmentation, and said second portion is made of a second material having a second pigmentation different from said first pigmentation, and wherein the wavelength of the laser beam is set such that the laser beam generally passes through said first portion and is absorbed by said second portion, thereby heating said second material to create a weld between said first and second portions.

10. The instrument panel of claim 9, wherein the temperature of the weld is monitored and the intensity and/or wavelength of the laser beam is adjusted according to the temperature of the weld.

11. The instrument panel of claim 3, wherein said first portion includes a third wall, and said second portion includes a fourth wall, said third and fourth walls defining a second channel for air ventilation through said instrument panel, and wherein said wire is disposed between said channel and said second channel.

12. The instrument panel of claim 1, wherein said wire is a flexible flat cable such that said flexible flat cable is disposed between flat portions of said first and second portions, thereby creating a relatively small gap adjacent said flexible flat cable between said first and second portions.

13. The instrument panel of claim 1, wherein said first portion includes a generally flat surface having a groove formed therein, said groove receiving said wire, and wherein said second portion includes a generally flat portion covering said groove and said wire.

14. An instrument panel comprising:

a first portion;

a second portion separate from said first portion; and at least one wire disposed between said first and second portions, wherein said first and second portions are welded together, thereby trapping and retaining said wire;

wherein said first portion includes a first wall, and said second portion includes a second wall, said first and second walls defining a channel for air ventilation through said instrument panel;

wherein said first portion includes a third wall, and said second portion includes a fourth wall, said third and fourth walls defining a second channel for air ventilation through said instrument panel; and wherein said wire is disposed between said channel and said second channel.

15. An instrument panel comprising:

a first portion;

a second portion separate from said first portion; and at least one wire disposed between said first and second portions, wherein said first and second portions are welded together, thereby trapping and retaining said wire;

wherein said first portion includes a generally flat surface having a groove formed therein, said groove receiving said wire, and wherein said second portion includes a generally flat portion covering said groove and said wire.

* * * * *